United States Patent [19]
Wills et al.

[11] Patent Number: 6,121,749
[45] Date of Patent: Sep. 19, 2000

[54] VARIABLE-SPEED DRIVE FOR SINGLE-PHASE MOTORS

[75] Inventors: Frank E. Wills, York, Pa.; William Leslie Kopko, Springfield, Va.

[73] Assignee: Work Smart Energy Enterprises, Inc., Washington, D.C.

[21] Appl. No.: 09/307,701

[22] Filed: May 10, 1999

Related U.S. Application Data

[60] Provisional application No. 60/084,919, May 11, 1998.
[51] Int. Cl.[7] ........................................................ H02P 5/28
[52] U.S. Cl. ............................ 318/811; 318/751; 318/785
[58] Field of Search ............................ 318/727, 794–795, 318/797, 747, 748, 749, 774, 778, 779, 803, 805, 811, 812

[56] References Cited

U.S. PATENT DOCUMENTS

| | | | |
|---|---|---|---|
| 3,624,470 | 11/1971 | Johnson | 318/221 G |
| 4,651,079 | 3/1987 | Wills | 318/811 |
| 4,706,180 | 11/1987 | Wills | 363/132 |
| 4,958,118 | 9/1990 | Pottebaum | 318/727 |
| 5,136,216 | 8/1992 | Wills et al. | 318/123 |
| 5,146,147 | 9/1992 | Wills et al. | 318/797 |
| 5,218,283 | 6/1993 | Wills et al. | 318/748 |
| 5,252,905 | 10/1993 | Wills et al. | 318/807 |
| 5,796,234 | 8/1998 | Vrionis | 318/751 |

*Primary Examiner*—Paul Ip
*Assistant Examiner*—Rina I. Duda
*Attorney, Agent, or Firm*—Rothwell, Figg, Ernst & Manbeck

[57] ABSTRACT

A single-phase variable-frequency power supply with two output voltages drives a single-phase AC motor that has a start circuit and main winding. For permanent split-capacitor motors, the power supply maintains a constant voltage to the start winding while it reduces the voltage to the main winding at lower frequencies. The power supply can similarly control the speed of capacitor-start and split-phase motors. For fans and pumps and other variable-torque applications, the power supply maintains approximately a constant ratio of main-winding voltage to the square of frequency. The power supply is preferably an electronic pulse-width modulated inverter.

9 Claims, 9 Drawing Sheets

VARIABLE-SPEED DRIVE FOR SINGLE-PHASE MOTORS

The applicant claims benefit of U.S. provisional application number 60/084,919 filed on May 11, 1998.

BACKGROUND OF THE INVENTION

1. Field of the Invention

This invention is an improved variable-frequency drive for single-phase AC motors.

2. Prior Art

Prior art involves various approaches for variable-frequency drives for single-phase induction motors. The first approach uses an inverter to supply a single-phase, sinusoidal output of variable voltage and frequency. The voltage is normally reduced in proportion to the frequency.

While this approach can give some variation in motor speed, it has several problems. One problem is that the impedance of the run capacitor increases as the frequency is reduced. This high impedance reduces current in the start winding, which means that the torque of the motor is not sufficient to start the motor at low frequency. In addition, the prior art uses a filter to remove the high-frequency components from the power supply, which adds to the cost and complexity of this approach.

The second approach uses a two-phase inverter. This setup removes the run capacitor from the circuit and supplies the start winding with a voltage that is 90° out of phase with voltage for the main winding. Since the run capacitor is normally sized so that the voltage across the start winding is higher than that for the main winding, the inverter must also supply a higher voltage to the start winding.

There are two problems with this approach. The first problem is that the inverter must create a voltage that is higher than the utility line voltage in order to supply the start winding, which adds cost and complexity to the electronics. The second problem is that the required voltage for the start winding varies from motor to motor so that field retrofit of a motor is difficult.

SUMMARY OF THE INVENTION

The current invention uses a new approach to solve the problems with the prior art. Unlike the prior art it supplies a dual-voltage, single-phase output. For PSC (permanent split-capacitor) motors the run capacitor is kept in the circuit, which eliminates the need for a second phase. For split-phase or capacitor-start motors the start winding is energized only during start up.

Keeping the capacitor also eliminates the need for a voltage that is higher than that from the utility in order to supply the start winding. Using the existing run capacitor also simplifies retrofit on an existing motor, since the power supply can provide the standard line voltage at full speed. The two voltages also allow the motor to develop a large starting torque at low frequencies. Another advantage of the invention is that the output need not be filtered, which means that a conventional pulse-width modulated output is acceptable. These advantages reduce the cost and improve the performance of the present invention compared to the prior art.

DESCRIPTION OF THE INVENTION

Figure 1:
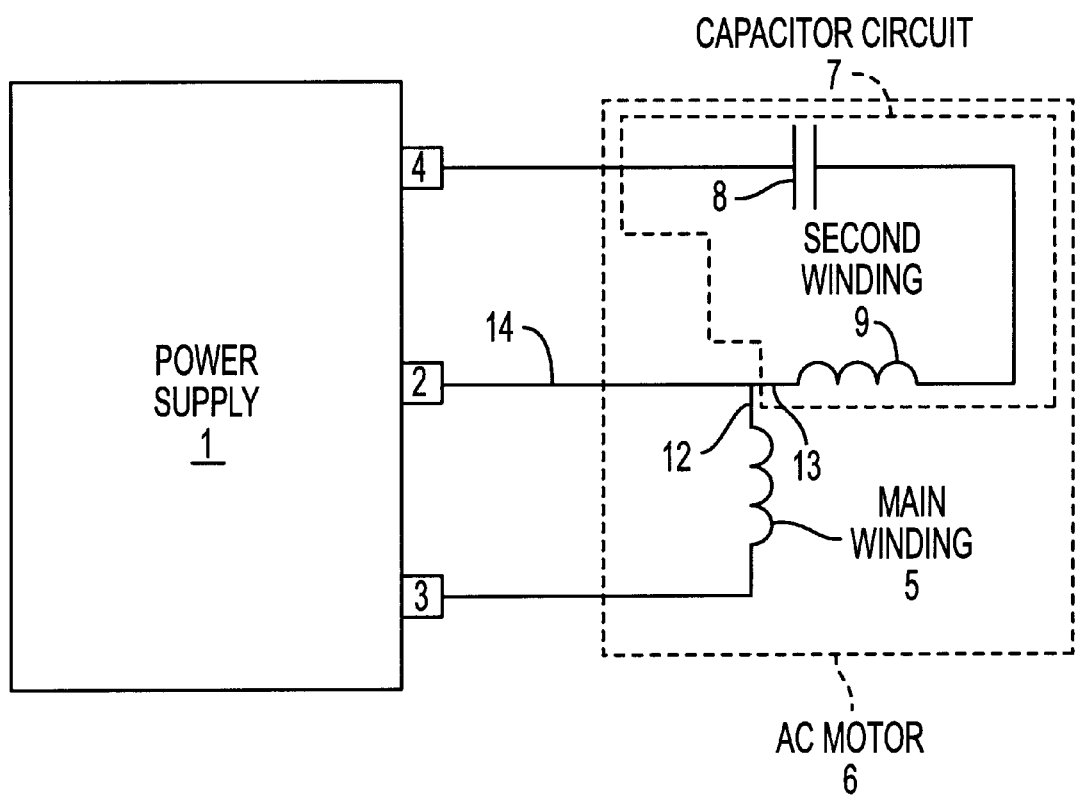
FIG. 1 is a block diagram of the invention.

FIG. 1 shows a basic embodiment of the invention. A variable-frequency AC power supply 1 has a common terminal 2, a first voltage terminal 3 and a second voltage terminal 4. A single-phase AC motor 6 has two windings. The power supply's first voltage terminal 3 is connected to a first end 10 of the main winding 5 for the AC motor 6. The start circuit 7 also has two ends. The start circuit comprises a second motor winding 9. The impedance of the start circuit differs from that of the main winding and the circuit would include a capacitor or high winding resistance to shift the phase of the current with respect to that of the main winding. The power supply's second voltage terminal 4 is connected to a first end 11 of start circuit 7. The power supply's common terminal 2 is connected by way of conductor 14 to the main winding's second end 12 and the start circuit's second end 13.

The operation of the power supply controls the speed of the motor. The voltage between the power supply's first and common terminals is normally in phase with the voltage between the second and common terminals. For a typical motor at full speed, the power supply applies a voltage to both the start circuit and the main motor winding that is close to the nominal line voltage for the motor. At low speeds the power supply reduces the voltage to the main winding, while maintaining roughly a fixed voltage across the start circuit. The reactance of the capacitor is inversely proportional to frequency, which means that voltage drop across the capacitor increases with the reduced frequency. The current through the start circuit decreases in proportion to the frequency.

A pump or fan has approximately a squared relation between required torque and speed, which means that the current in the start circuit and the main winding should drop inversely with frequency. For a PSC (permanent-split capacitor) motor the start circuit would include a capacitor, which corresponds to a fixed voltage across the circuit. For the main winding the voltage should drop with the square of the frequency. This relation means that a 50% reduction in frequency corresponds to a 75% reduction in voltage.

For a positive-displacement compressor or other constant torque application, it may be necessary to start the motor at relatively high frequency in order to obtain adequate current through the capacitor. Once the motor speed is close to the synchronous speed, the torque output from the main winding is much higher, and the frequency can be reduced. Another option is to increase the voltage across the start circuit to more than the line voltage. The main winding should have close to a constant voltage to frequency ratio for constant torque applications.

The power supply can also control the direction of rotation of the AC motor by reversing the phase of the voltage of the second terminal. A second, less-desirable option is to include a double-pole double-throw switch that reverses the connections to either the start circuit or the main winding to reverse motor rotation. This second option requires access to both ends of each winding which normally share a common connection inside the motor housing, which means that disassembly would be necessary.

Figure 2:
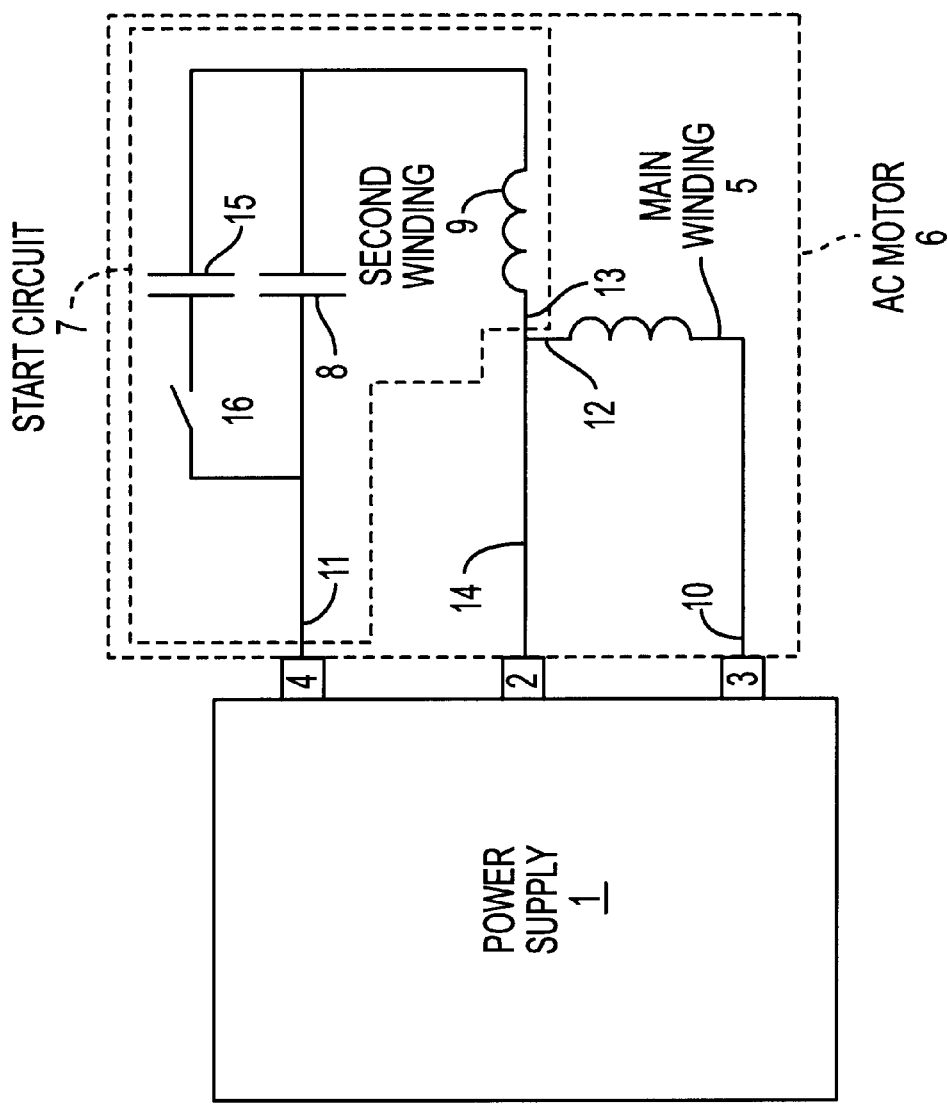
FIG. 2 shows an alternate embodiment that uses a start capacitor that increases motor torque at low speeds.

FIG. 2 shows an alternate embodiment that includes a start capacitor. A start capacitor 15 is in parallel with a run capacitor 8. The run capacitor may be eliminated, since the main winding can be designed to provide adequate torque once the motor is close to synchronous speed. A switch 16 opens at higher motor speeds to increase the reactance of the start circuit 7. The switch may be controlled by the power supply to open at a particular frequency or it may be a centrifugal switch that opens once the motor shaft reaches a certain speed. A third, less-desirable alternative is to open the switch manually. A fourth option is a time delay opening of the switch within a few seconds after the motor start.

Figure 3:
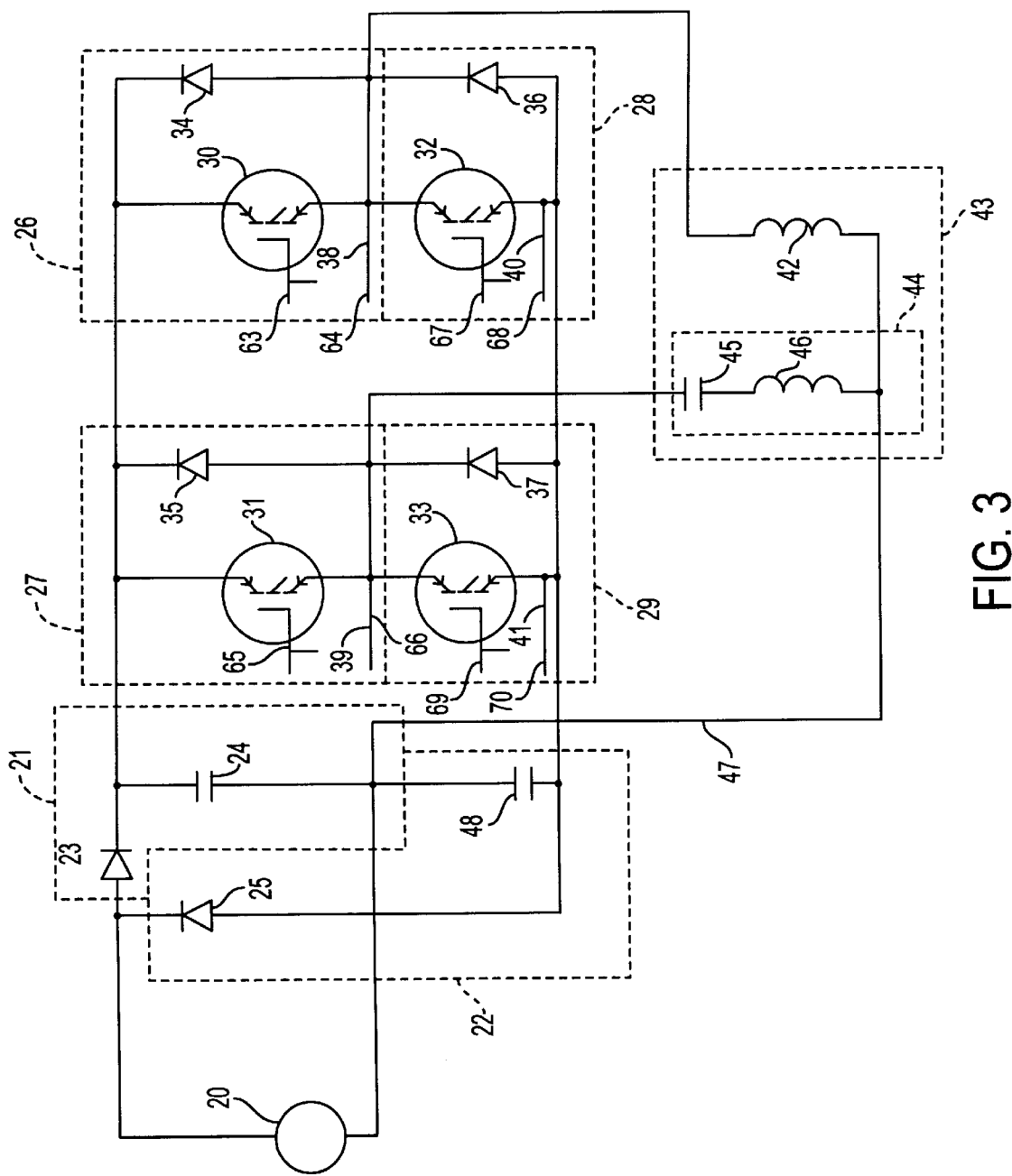
FIG. 3 shows a circuit diagram of an embodiment that includes an electronic converter.

FIG. 3 shows a schematic diagram of an embodiment that includes a power converter. Voltage input 20, which is normally from a fixed-frequency AC utility power line, supplies power to the converter. The utility power line would normally be either 115 or 230 V, 60 Hz, single-phase. Two rectifiers accept the AC power input and convert it into positive and negative DC voltages. The first rectifier 21 comprises a diode 23 and capacitor 24 and supplies a positive DC voltage. The second rectifier 22 likewise comprises another diode 25 and a capacitor 48.

The inverter section of the of the power supply has four controllable switching devices 26, 27, 28, and 29. Each controllable switching device has a control input, a power output, and a power input. Each switching device comprises an IGBT (insulated gate bipolar transistor) 30, 31, 32, and 33 in parallel with a freewheeling diode 34, 35, 36, and 37. The first rectifier 21 supplies a positive DC voltage to the power input for the first switching device 26 and the second switching device 27. The second rectifier 22 supplies a negative DC voltage to the third and fourth switching devices 28 and 29 respectively. Pulse-width-modulated control voltages 38, 39, 40, and 41 respectively are supplied to the control input for each IGBT which controls the operation of each switching device. Each control voltage input is supplied by a pair of signals 63, 64; 65, 66; 67, 68; and 69, 70 respectively. The power outputs from switching devices 26 and 28 are connected to the main motor winding 42 of AC motor 43. Likewise the power outputs from the switching devices 27 and 29 are connected to the start circuit 44. Capacitor 45 and a second winding 46 for the motor are connected in series to form the start circuit. A conductor 47 provides a common connection to the other end of the motor windings back to the utility power supply to complete the circuit.

While this circuit diagram uses IGBTs as the switching devices, power FETs (field-effect transistors) could be substituted with little or no change. Power FETs may have efficiency and cost advantages at low power outputs. GTO's (gate turnoff thyristors) or SCR's (silicon controlled rectifier), transistors, and MCTs (MOS-Controlled Thyristors) could serve as switching devices but require different control circuits as is well documented in prior art. Although not preferred, vacuum tubes or reed relays are also potential switching devices.

While the embodiment in FIG. 3 uses rectified AC power from a utility for the DC power supplies, other sources of power could also be used. For example, batteries, DC generators, photovoltaic cells, etc. could supply DC power directly. Rectified variable-frequency AC power from a wind turbine could also serve as power source. Many other sources of power are possible and may be used in special applications.

Figure 4:
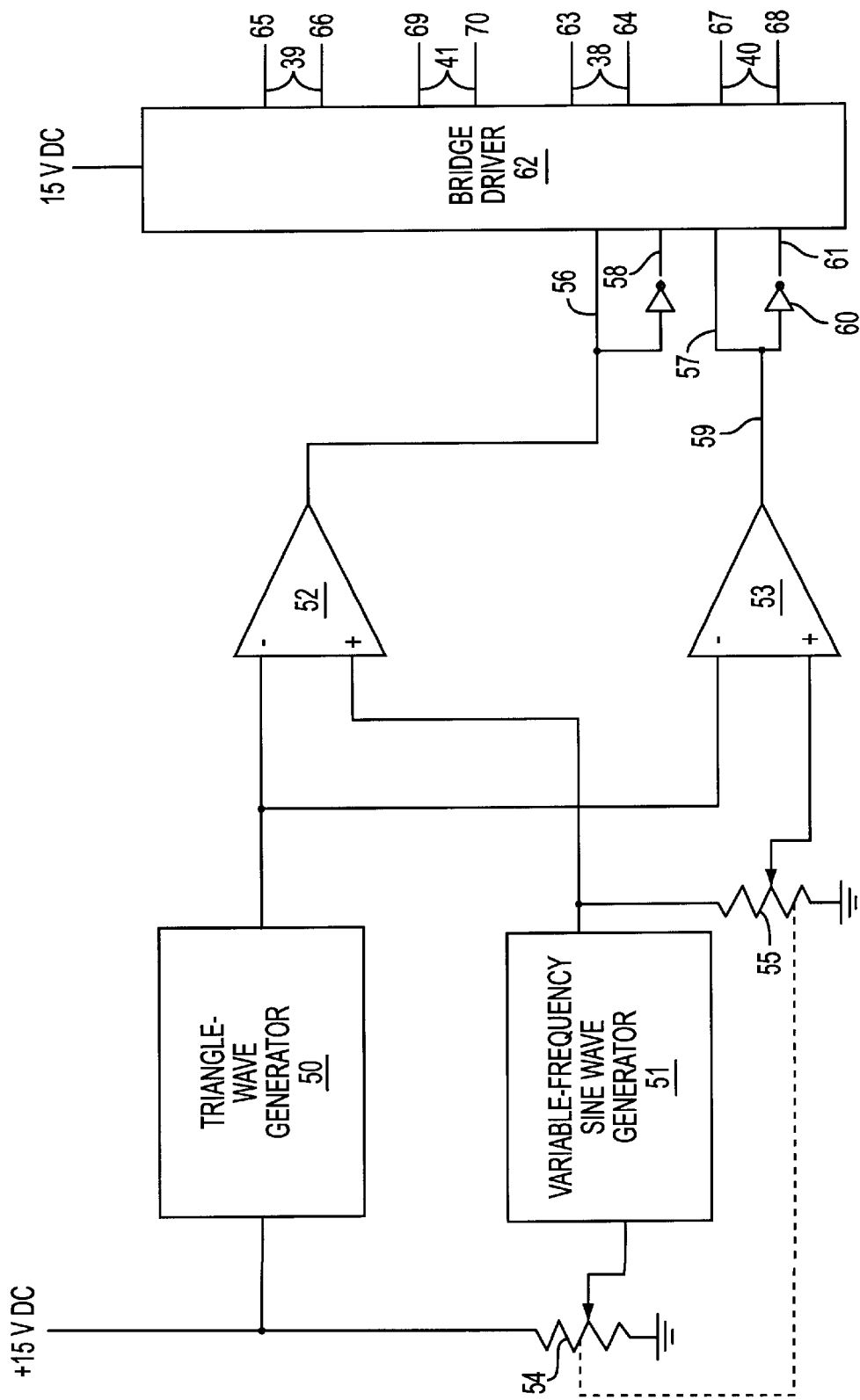
FIG. 4 shows an example logic circuit for the converter.

FIG. 4 shows a control circuit that may be used with the power electronics in FIG. 3. A triangle-wave generator 50 is connected to the negative inputs of a first comparator 52 and a second comparator 53. The comparators may be Harris Semiconductor model LM2901. The operating frequency of the triangle wave generator should be between about 1 kHz and 20 kHz and is preferably about 5 kHz. A variable-frequency sine-wave generator 51 is connected to the positive inputs of the two comparators. The sine-wave generator would normally operate from about 2 Hz to 60 Hz. Both the sine wave and triangle-wave generators can be the same component such as a Harris Semiconductor waveform generator ICL 8038. A potentiometer 54 supplies a variable DC input voltage to the sine wave generator 51 to vary its output frequency. The potentiometer 54 is mechanically connected to a second potentiometer 55 that controls the amplitude of the sine-wave signal going to the positive input to the second comparator.

The first comparator supplies a main signal 56 that is pulse-width-modulated for a reduced voltage at lower frequencies. For fans and pumps this signal may approximate a constant ratio of voltage to the square of frequency. For other applications a constant voltage to frequency ratio may be used. A signal inverter 57 creates a complementary main signal 58.

The second comparator supplies an auxiliary output signal 59 that is pulse-width modulated for an approximately fixed voltage. A second signal inverter 60 creates a complementary auxiliary signal 61.

All four of these signals from the comparators and the signal inverters serve as inputs to the bridge driver 62. For 115V output, the bridge driver may be an International Rectifier model IR2130 three-phase bridge driver. The bridge driver may be operated with only 4 of the 6 gates used. In larger scale production, an option is to use a custom-built driver that does not have unused gates. A +15V DC source supplies power to the bridge driver.

The output signals from the bridge driver control the operation of the IGBTs. Each output signal pair provides the control signal to one IGBT. The first pair 63 and 64 provides control signal 38 to IGBT 30 in FIG. 3. The second pair 65 and 66 provides control signal 39 to IGBT 31 in FIG. 3. The third pair 67 and 68 provides signal 40 to IGBT 32, and likewise the fourth pair 69 and 70 provides control signal 41 to IGBT 33.

The diagram in FIG. 4 shows a basic control circuit. Production circuits may require power supplies, current-limit control, temperature-limit control, special start-up controls, etc.

There are many other circuit designs that could provide similar functions. The controller could use a microprocessor-based circuit instead of discrete components. The potentiometers may be replaced with electronic controls that allow for automatic control of the motor speed. The details of these design options are available in the prior art.

Figure 5:
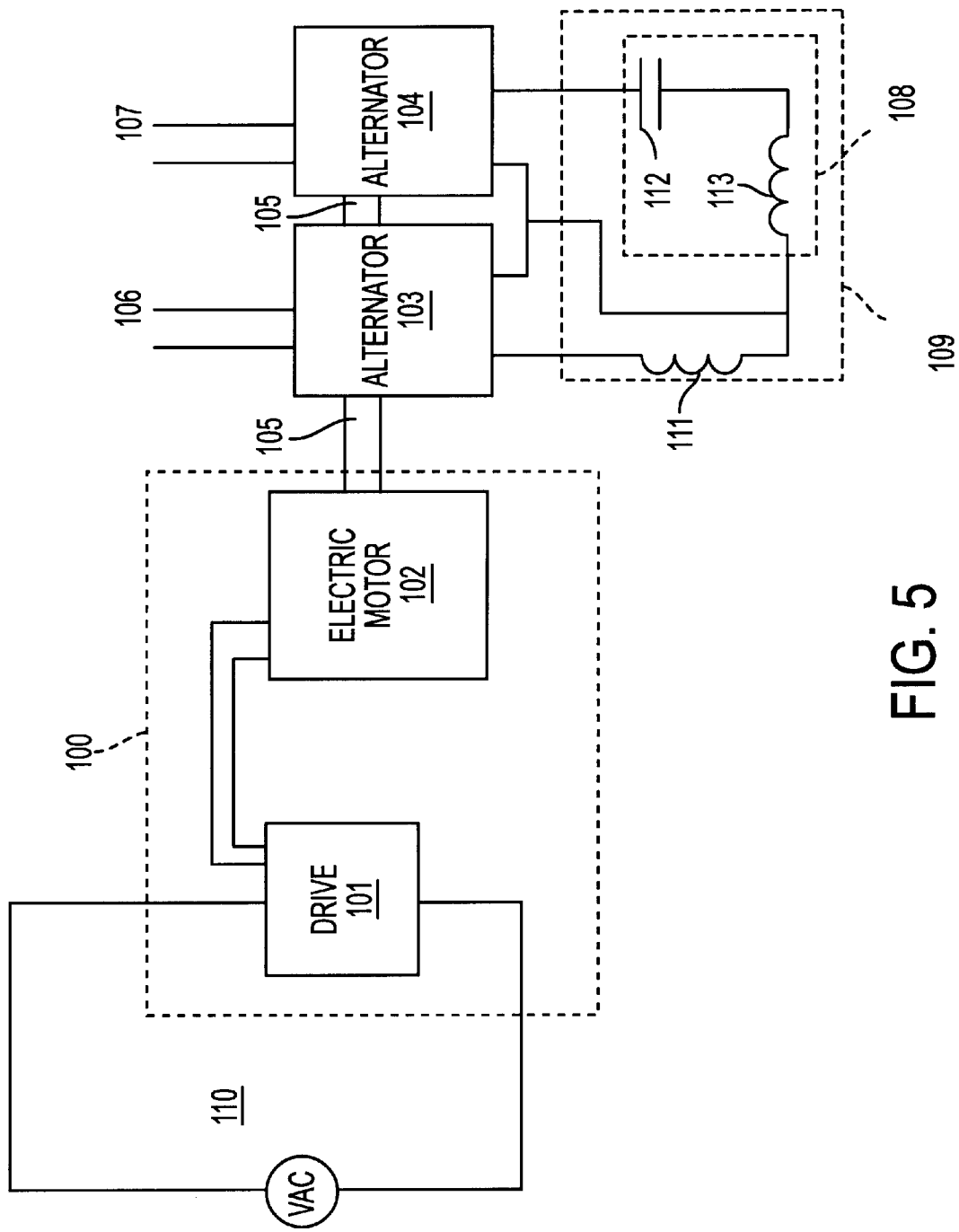
FIG. 5 shows an electromechanical embodiment of the invention that uses a variable-speed generator to supply variable-frequency power.

FIG. 5 shows another embodiment that uses an electromechanical frequency converter. A variable-speed motor assembly 100 includes a drive 101 and an electric motor 102. The drive receives alternating-current power from the utility power line 110. The variable-speed motor assembly may be a DC drive and DC motor or a three-phase inverter and three-phase motor. Another option is to use a gas turbine, internal-combustion engine or other prime mover in place of the variable-speed motor assembly. The shaft output 105 drives two alternators 103 and 104. The excitation voltage 106 for the rotor of the first alternator is approximately fixed to provide a fixed voltage to frequency ratio for the output. The excitation voltage 107 to the rotor of the second alternator is increased at lower speeds to maintain an approximately fixed output voltage. The mechanical arrangement of alternators keeps the output voltages in phase. The output from the first alternator powers the main winding 111 of AC motor 109. The output from the second alternator provides power to the capacitor circuit 108 of motor 109. The motor circuit includes a capacitor 112 in series with a second motor winding 113.

Figure 6:
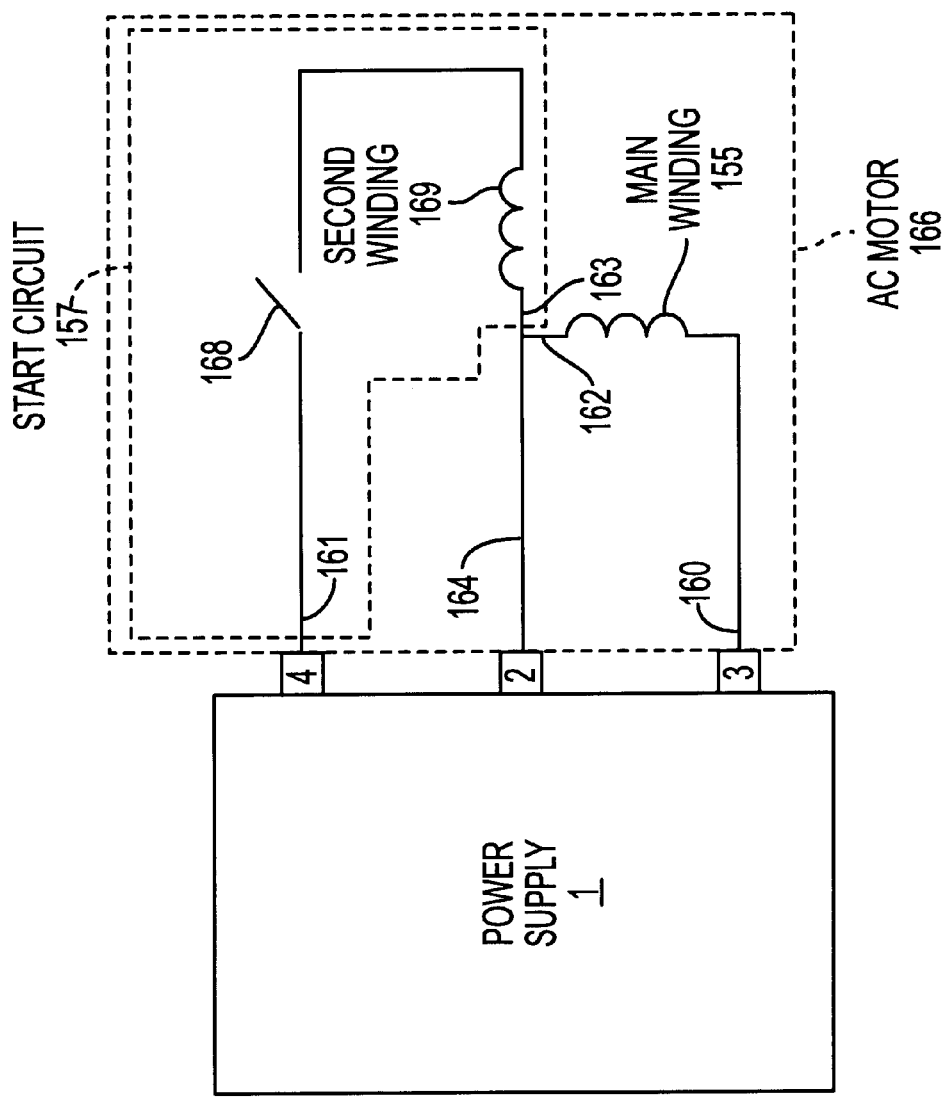
FIG. 6 shows an embodiment that uses a split-phase motor.

FIG. 6 shows an embodiment that uses a split-phase motor. The split-phase AC motor 166 contains a main winding 155 with two ends 162 and 160. End 160 is connected to the first voltage terminal 3 of power supply 1 and end 162 is connected to the common terminal 2 by way of conductor 164. The start circuit 157 includes switch 168 that opens after start up which is in series with second winding 169. The second winding normally has a high resistance compared to the main winding to create a phase difference between the currents in the two windings. The start circuit has two ends 161 and 163; end 161 is connected to the second terminal 4 of the power supply and end 163 is connected to the common terminal 2 by way of conductor 164. The power supply maintains a constant voltage to the start circuit and approximately a fixed voltage to frequency ratio on the main winding during start up. Once the motor is running at high speed, the switch to the start circuit opens and the main winding drives the motor.

This arrangement would require that the motor have separate terminals for the start winding and the main winding. While not preferred, another option is to supply the same voltage to both the main winding and the start winding. The problem with this approach is that the motor will not normally start unless the frequency is close to 60 Hz, which creates a large inrush current. One approach is to size the variable-frequency power supply to handle this high inrush current, which can be five times the run current.

A better approach is to start the motor from the utility power line, and then switch to the variable-frequency power supply. This approach eliminates the need for the power supply to handle inrush current. It would normally require a contactor for starting the motor, a control means for synchronizing the voltage from the power supply with the power line, and a means for switching between the line and the variable-frequency power supply. If the main winding can develop adequate torque, this approach can eliminate the need for a supplying current to the start circuit, which could eliminate the need for two of the switching devices in the power supply. This approach can start any type of single-phase motor.

Figure 7:
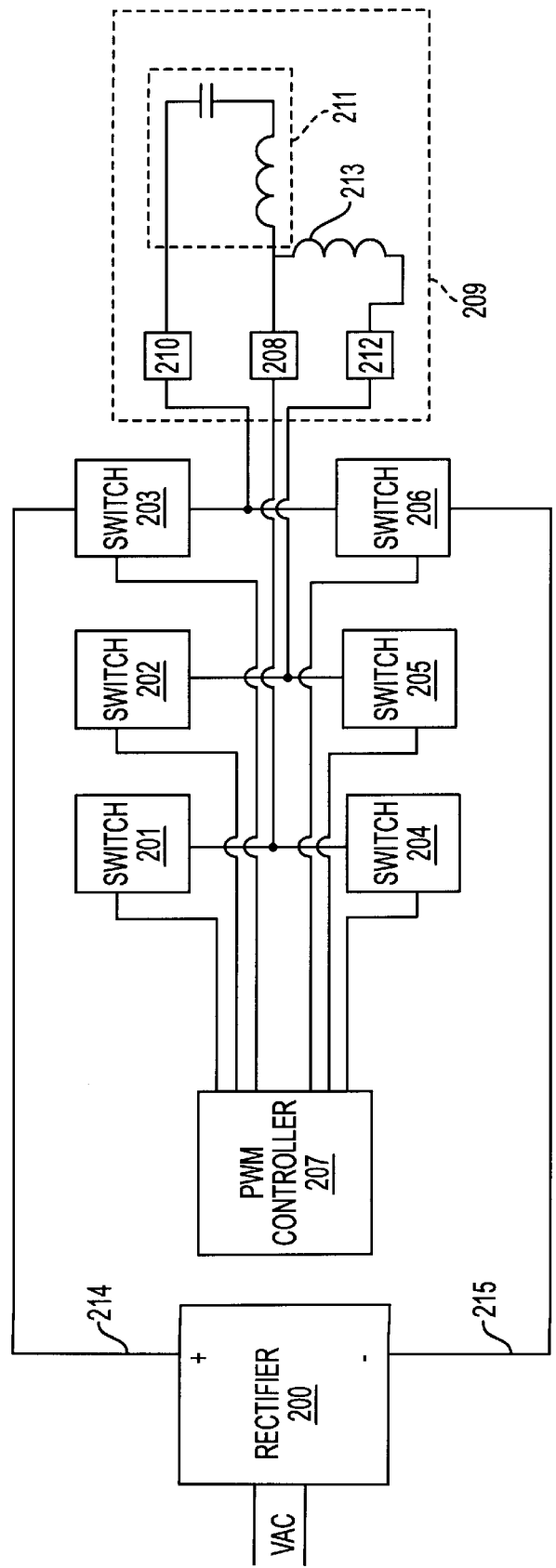
FIG. 7 is an embodiment that uses an inverter with a three-legged bridge to control a single-phase motor.

FIG. 7 shows how the new system can allow a three-phase inverter to drive a single-phase motor. The inverter comprises a rectifier 200 and six controllable switching devices 201, 202, 203, 204, 205, and 206. Each switching device has a control input and power input and a power output. The rectifier supplies a positive DC voltage 214 to the power inputs for the first, second, and third switching devices 201, 202, and 203. For transistor-based devices such as IGBTs or FETs the positive DC voltage is connected to the drain which serves as the power input and the source serves as the power output. The rectifier also supplies a negative voltage 215 to the power inputs for the fourth, fifth, and sixth switching devices 204, 205, and 206. For field-effect devices, the "source" serves as the power input for the negative DC voltage and the drain serves as the power output. A pulse-width-modulated controller 207 is connected to the control inputs for each of the six switching devices. This setup is typical for standard three-phase inverters.

The difference from the prior art comes in the connections and the control logic. The output from the power outputs for the first and fourth switching devices 201 and 204 are connected to the common terminal 208 of the single-phase motor 209. The power outputs for the second and fifth switching devices 202 and 205 provide a first voltage to terminal 212 of the main circuit 213 for the motor. The power outputs for the third and sixth switching devices 203 and 206 connect to the second voltage terminal 210 that supplies the start circuit 211. The controller 207 supplies a pulse-width-modulated signal to each of the switching devices.

Figure 8:
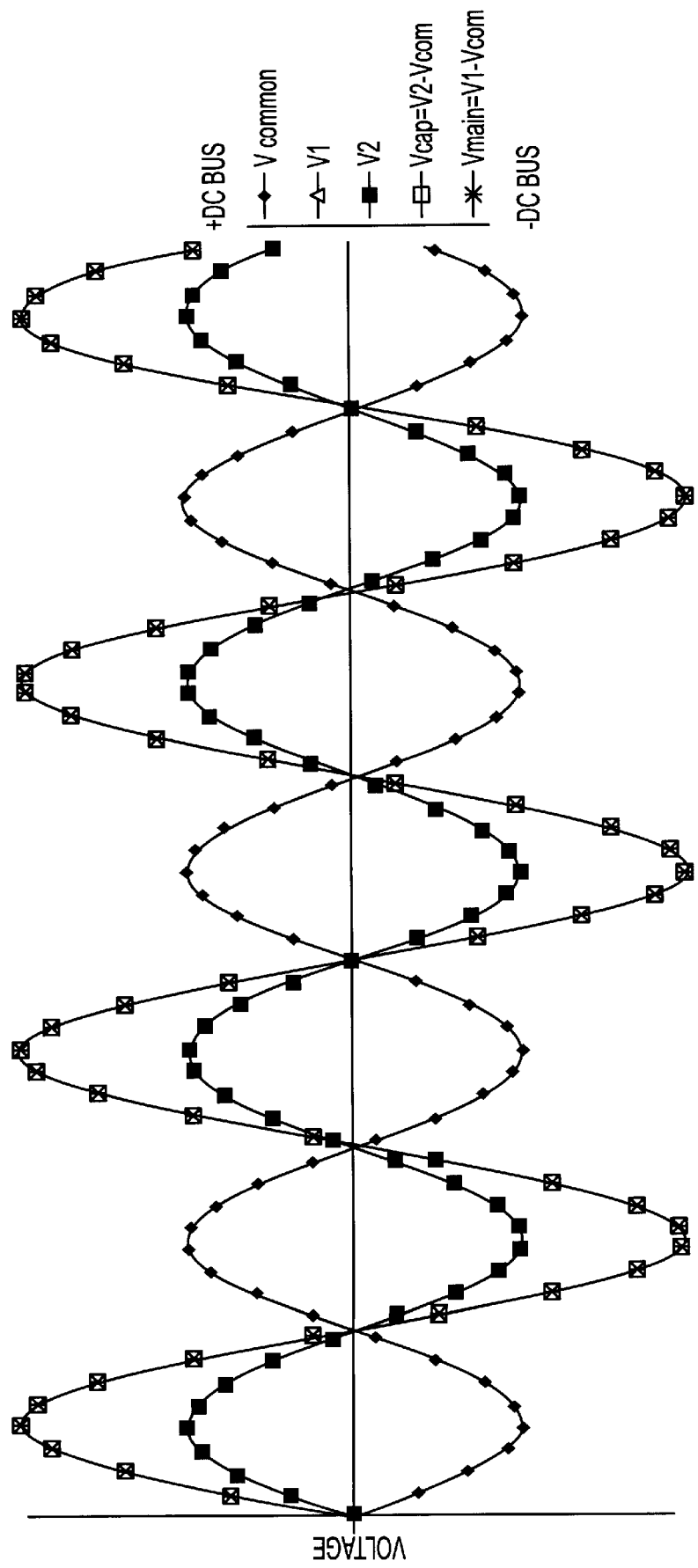
FIG. 8 shows average output voltage from this inverter at full speed.
Figure 9:
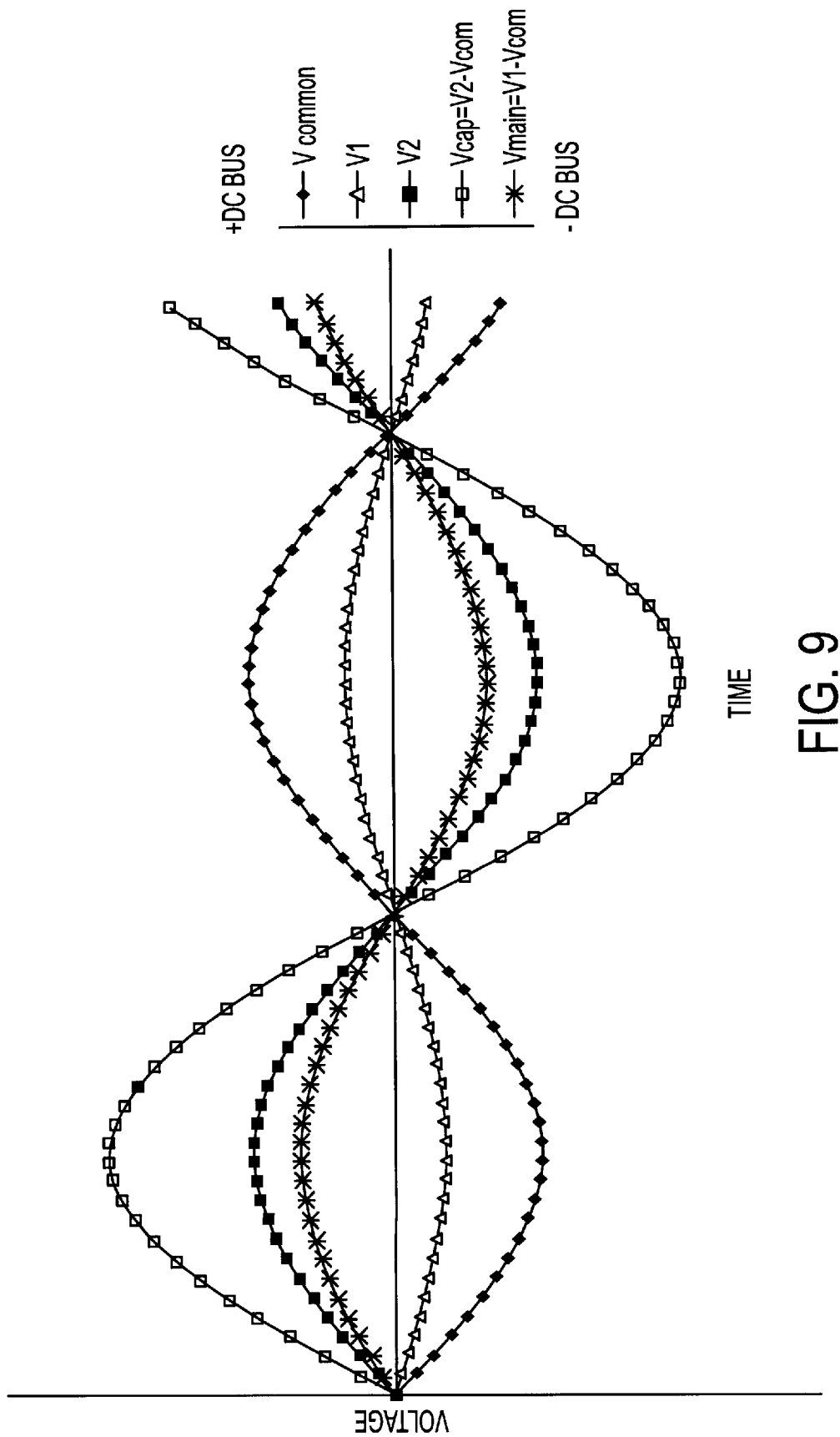
FIG. 9 shows average output voltage from this inverter at reduced speed.

FIGS. 8 and 9 show how a three-legged arrangement such the one in FIG. 7 can control the speed of a single-phase motor. FIG. 8 shows the average output voltages from the inverter at full speed, while FIG. 9 shows the outputs at reduced speed. (The actual voltage is a series of short pulses that approximate these average values.) At full speed the average voltage across the start circuit (Vcap) and the average voltage across the main winding (Vmain) have the same value. At this condition, the first and second voltage terminals (V1 and V2) have the same average voltages, which are opposite from that of the common terminal.

FIG. 9 shows the average voltages at a reduced output frequency which corresponds to a slower motor speed. The voltage across the start circuit stays the same as at design conditions which means that the common voltage terminal and the second voltage terminal have the design voltage at the lower frequency. The voltage of the first terminal changes magnitude in order to allow the reduction in the voltage applied to the main winding.

One way of describing this control is in terms of modulation index. For a PWM output from a half bridge, two switching devices normally act as single-pole, double-throw switch. This arrangement means that the output of the half bridge can be +ON and −ON depending whether it is connected to the positive DC supply or the negative DC supply. A modulation index of zero corresponds to pulses of equal duration in the +ON and −ON states. A modulation index of one corresponds to a sine wave with peak voltage equal to the DC bus voltages.

This system varies the modulation index of the first voltage terminal (which is connected to the main winding) while maintaining a modulation index of one to the second terminal and the common terminal. At full voltage across the main winding, the modulation index of the first terminal is one (i.e. 100%), and the amplitude is in phase with that of the second terminal. For zero average voltage across the main winding, the modulation index of the first terminal is again one. The difference is that the amplitude is in the opposite direction so that the voltage of the first terminal is in phase with that of the common terminal. At half voltage on the winding, the modulation index is zero. The index varies linearly with the average voltage for the main winding for conditions between these points.

Overall this system has major advantages over the prior art, including the following advantages:

1) drives standard single-phase induction motors at variable speeds, 2) does not require generation of a voltage that is higher than the line voltage, 3) generates good starting torque without excessive inrush current, 4) allows use of a bypass switch to allow motor operation from a single-phase power supply, 5) is compatible with electromechanical alternators, and 6) can use existing inverter hardware designed for driving three-phase motors.

The invention having thus been described, it will be apparent to those skilled in the art that the same may be varied in many ways without departing from the spirit and scope of the invention. Any and all such modifications are intended to be encompassed within the following claims.

What is claimed is:

1. An apparatus for controlling the speed of a single-phase AC motor that has a main winding and a start circuit that has an impedance that is different from that of said main winding and that includes a second motor winding, said apparatus comprising:

a variable-frequency AC power supply with at least one common terminal connected to a first end of said main winding and a first end of said start circuit, a first terminal for supplying a variable voltage that is connected to a second end of said main motor winding, and a second voltage terminal whose voltage output is substantially in phase with the output of said first voltage terminal and is connected to a second end of said start circuit whereby said power supply reduces the ratio of the voltage across the main winding to that across the start circuit at lower output frequency.

2. The apparatus of claim 1 where said second terminal of said power supply provides a fixed voltage to said start circuit.

3. The apparatus of claim 1 wherein said AC power supply comprises a converter with a variable frequency output that can accept input power from a utility power line.

4. The apparatus of claim 3 further comprising a bypass switch that connects said main winding and said start circuit to said utility power line so that said motor may run at a fixed speed without said converter.

5. The apparatus of claim 3 wherein said converter comprises:

four controllable switching devices that each have a control input, a power input, and a power output;

a first rectifier for supplying a positive DC voltage relative to said common terminal that accepts power from said power line and is connected to the power inputs of the first and second controllable switching devices;

a second rectifier for supplying a negative DC voltage relative to said common terminal that accepts power from said power line and is connected to the power inputs for the third and fourth controllable switching devices; and a pulse-width modulating controller connected to the control inputs for said first, second, third, and fourth controllable switching devices whereby the power outputs of said first and third controllable switching devices are connected to said first terminal of said power supply and the power output of a said second and fourth switching devices are connected to said second terminal of said power supply.

6. The apparatus of claim 3 wherein said converter comprises:

six controllable switching devices that each have a control input, a power input, and a power output, a rectifier that is connected to said power line and which supplies a positive voltage to the power inputs for the first, second, and third controllable switching devices and supplies a negative voltage to power inputs for the fourth, fifth, and sixth controllable switching devices, the power outputs of said first and fourth controllable switching devices are connected to said common terminal, the power outputs for said second and fifth controllable switching devices are connected to said first voltage terminal, the power outputs for said third and sixth controllable switching devices are connected to said second voltage terminal, and a pulse-width-modulated controller connected to the control inputs of said first, second, third, fourth, fifth, and sixth controllable switching devices.

7. The apparatus of claim 1 wherein said power supply comprises:

a first alternator for supplying variable AC voltage with a variable-speed shaft input and a first output terminal that is connect to said common terminal of said power supply and a second output terminal that is connect to said first voltage terminal of said power supply, a second alternator that shares said variable-speed shaft input and that has a first output terminal that is connected to said common terminal of said power supply and a second output terminal is connect to said second that supplies an AC voltage to said second voltage terminal of said power supply.

8. The apparatus of claim 7 wherein said variable-speed shaft input comprises a variable-speed electric motor that receives power from a utility power line.

9. A method of controlling a single-phase AC motor having a first winding and a start circuit that has an impedance that differs from that of the first winding and includes a second motor winding, said method comprising:

supplying a first variable-frequency AC voltage across the main winding, supplying a second variable-frequency AC voltage across said start circuit that is substantially in phase with said first variable-frequency AC voltage, and reducing the ratio of the voltage across the first winding to that across the start circuit at lower output frequencies.

\* \* \* \* \*